United States Patent
Jha et al.

(10) Patent No.: US 10,631,359 B2
(45) Date of Patent: Apr. 21, 2020

(54) DISCONTINUOUS RECEPTION (DRX) IN A DEVICE READY STATE

(71) Applicant: INTEL CORPORATION, Santa Clara, CA (US)

(72) Inventors: Satish Jha, Portland, OR (US); Kathiravetpillai Sivanesan, Portland, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 21 days.

(21) Appl. No.: 15/557,418

(22) PCT Filed: Dec. 2, 2015

(86) PCT No.: PCT/US2015/063534
§ 371 (c)(1),
(2) Date: Sep. 11, 2017

(87) PCT Pub. No.: WO2016/164077
PCT Pub. Date: Oct. 13, 2016

(65) Prior Publication Data
US 2018/0279408 A1    Sep. 27, 2018

Related U.S. Application Data

(60) Provisional application No. 62/145,768, filed on Apr. 10, 2015.

(51) Int. Cl.
*H04W 76/28* (2018.01)
*H04W 52/02* (2009.01)
*H04W 4/70* (2018.01)

(52) U.S. Cl.
CPC ....... *H04W 76/28* (2018.02); *H04W 52/0216* (2013.01); *H04W 4/70* (2018.02);
(Continued)

(58) Field of Classification Search
CPC ... H04W 76/28; H04W 52/0216; H04W 4/70; Y02D 70/1224; Y02D 70/24;
(Continued)

(56) References Cited

U.S. PATENT DOCUMENTS

2008/0232310 A1   9/2008   Xu
2011/0205928 A1*  8/2011   Pelletier ............... H04L 1/1883
                                                             370/252
(Continued)

FOREIGN PATENT DOCUMENTS

WO      2014025211 A1    2/2014

OTHER PUBLICATIONS

3GPP TR 45.820 V0.4.1; Cellular System Support for Ultra Low Complexity and Low Throughput Internet of Things; (Release 13) (Mar. 2015).
(Continued)

*Primary Examiner* — Jae Y Lee
(74) *Attorney, Agent, or Firm* — Thorpe North & Western

(57) ABSTRACT

Technology for a mobile station (MS) configured for cellular Internet of Things (CIoT) is disclosed. The MS can receive a ready state discontinuous reception (RS-DRX) configuration message from a base station, wherein the RS-DRX configuration message includes one or more RS-DRX parameters. The MS can initiate RS-DRX based on the one or more RS-DRX parameters included in the RS-DRX configuration message. The RS-DRX can enable the MS to be in a packet idle state of a ready state in between data communications by the MS with the base station. The MS can be configured to periodically switch from a defined sleep duration to a defined ON duration during the packet idle state of the ready state and check for downlink or uplink packet arrivals.

31 Claims, 9 Drawing Sheets

Device States and corresponding DL control channel monitoring requirements. A typical example with 2 short RS-DRX cycles

(52) U.S. Cl.
CPC ...... *Y02D 70/1224* (2018.01); *Y02D 70/1226* (2018.01); *Y02D 70/1262* (2018.01); *Y02D 70/142* (2018.01); *Y02D 70/144* (2018.01); *Y02D 70/146* (2018.01); *Y02D 70/24* (2018.01)

(58) Field of Classification Search
CPC ............ Y02D 70/1226; Y02D 70/142; Y02D 70/144; Y02D 70/1262; Y02D 70/146
See application file for complete search history.

(56) References Cited

U.S. PATENT DOCUMENTS

| | | | |
|---|---|---|---|
| 2013/0301501 A1* | 11/2013 | Olvera-Hernandez | .................... H04W 52/0216 370/311 |
| 2013/0322403 A1* | 12/2013 | Diachina | ........... H04W 72/1273 370/331 |
| 2014/0064160 A1* | 3/2014 | Verger | .................. H04W 72/14 370/311 |
| 2014/0198699 A1 | 7/2014 | Makharia et al. | |
| 2016/0295345 A1* | 10/2016 | Oh | ........................... H04W 4/70 |
| 2017/0311221 A1* | 10/2017 | Pudney | ................. H04W 60/00 |

OTHER PUBLICATIONS

3GPP TS 23.060 V13.2.0; General Packet Radio Services (GPRS); Service description; Stage 2 (Release 13) (Mar. 2015).

* cited by examiner

Device States and corresponding DL control channel monitoring requirements

Device States and corresponding DL control channel monitoring requirements. A typical example with 2 short RS-DRX cycles

DISCONTINUOUS RECEPTION (DRX) IN A DEVICE READY STATE

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
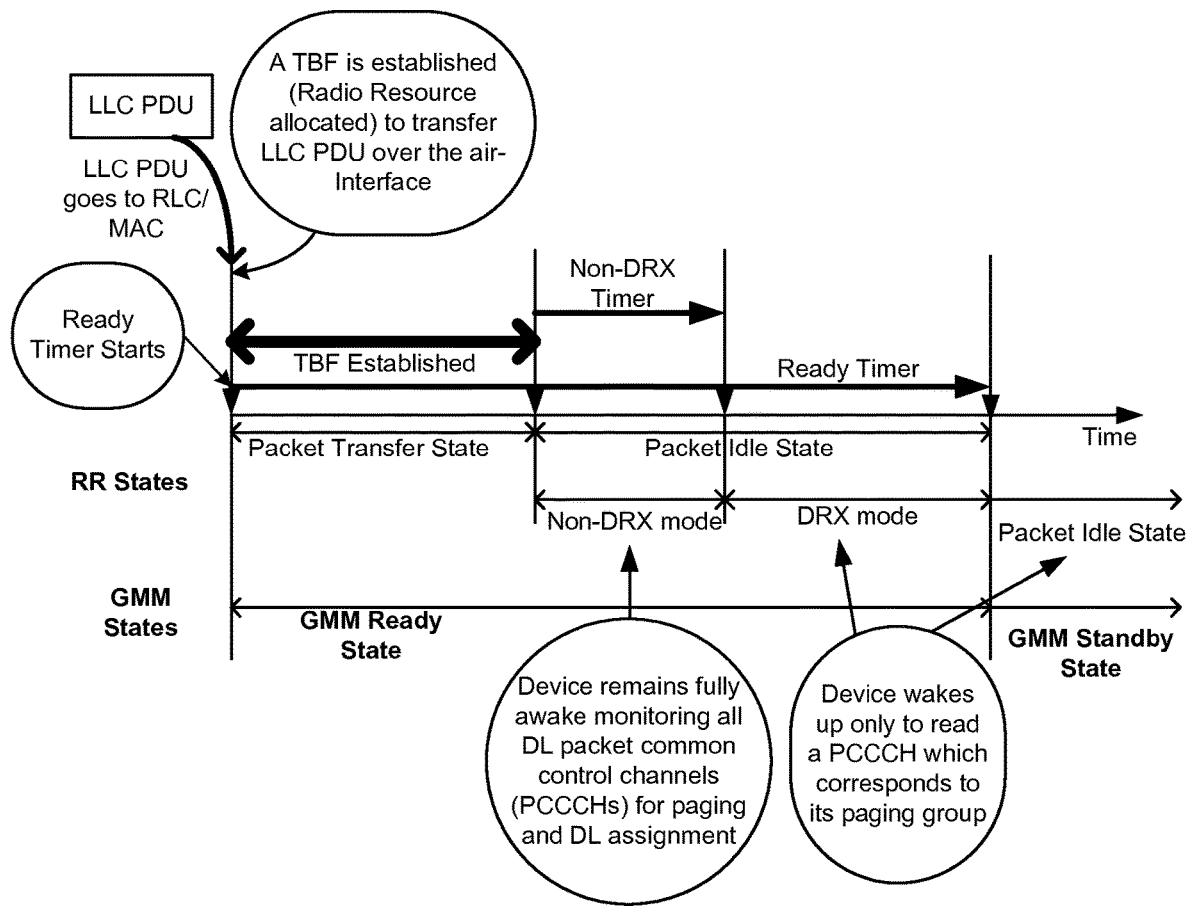
FIG. 1 illustrates a computing device that switches from a ready state to a standby state in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The Internet of Things (IoT) is the interconnection of computing devices scattered across the globe within an existing network infrastructure. Each computing device can be assigned a unique identifier, such as a uniform resource identifier (URI), or a global unique identifier. The computing devices may be able to capture information, and then securely communicate the information over a network to other computing devices or a centralized server computer with or without human intervention. The computing devices can be embedded in a variety of products, such as home appliances, automobiles, thermostats, smart traffic lights, etc. The Internet of Things can be useful for a number of applications, such as environmental monitoring, infrastructure management, industrial applications, building and home automation, energy management, medical and healthcare systems, transport systems, etc.

Cellular IoT (CIoT) can operate in licensed spectrum (i.e., computing devices can communicate over a cellular network). CIoT can offer a reduced cost of connectivity, improved battery life, robust device authentication and reliable connectivity. The use of licensed spectrum can allow controlled quality of service and provide global coverage, ideally over existing cellular bands and using existing cells, transceivers and antennas. The evolution in cellular technology from 2G to 3G to 4G has delivered enormous spectral efficiency gains, improved resource utilization, increased data rates and reduced latency. For high-end CIoT applications, this improved technology has value, but for low-end CIoT applications, this improved technology can add unnecessary cost and complexity to the computing device.

The 3GPP standard is currently developing Global System for Mobile Communications (GSM) Enhanced Data rates for GSM Evolution (EDGE) Radio Access Network (GERAN)-based cellular IoT (CIoT) solutions. GERAN provides an enhanced general packet radio service (GPRS), which is a packet oriented mobile data service for 2G and 3G cellular communications. Enhanced GPRS has been proposed to develop the GERAN-based CIoT, which is referred to as enhanced coverage GSM (EC-GSM). In EC-GSM, enhanced GPRS frame and channel structures have been adopted in downlink to keep backwards compatibility for coexistence with legacy GPRS.

In EC-GSM, a computing device (e.g., a CIoT device) can be in a GPRS Mobility Management (GMM) Ready State during data transmission and reception, as well as immediately after the data transmission or reception for a defined duration, as configured by a READY Timer. In the GMM Ready State, the computing device is known at a cell level to the network. In the GMM Ready State, the computing device can either be in a Packet Transfer State or a Packet Idle State. The computing device can move from the GMM Ready State to a GMM Standby State after expiry of the READY Timer.

In the GMM Standby State, the computing device is always in a Packet Idle State and known to the network at a routing area (RA) level. If a downlink (DL) packet arrives during the Packet Idle State (during the GMM Standby State), the network informs the computing device by sending a paging message. The computing device then performs a random access procedure in order to receive the DL data. Similarly, if an uplink (UL) packet arrives during the Packet Idle State (during the GMM Standby State), the computing device performs a random access procedure to transmit the UL data.

In one example, when the computing device is in the GMM Standby State, the computing device will move from the GMM Standby State to the GMM Ready State in order to receive the DL data or transmit the UL data. In other words, performance of the random access procedure can cause the computing device to transition from the GMM Standby State to the GMM Ready State. After the computing device transitions to the GMM Ready State, the computing device can perform a data transmission/reception event (i.e., receive the DL data or transmit the UL data). The transition from the GMM Standby State to the GMM Ready State can incur significant signaling overhead in the network and access latency. Therefore, frequent state transitions (e.g., GMM Standby State to GMM Ready State, and vice versa) adversely impact network performance and device power consumption.

In some CIoT use cases (e.g., industrial CIoT), the computing devices can transmit or receive packets in a more frequent manner (e.g., every 1-5 minutes). In such a use case, if the computing device is moved from the GMM Ready State to the GMM Standby State after each packet transmission or reception, there will be a large impact on network signaling overhead due to the state transitions (e.g., GMM Standby State to GMM Ready State, and vice versa). This problem can be magnified when thousands of computing devices are performing frequent state transitions in the network.

One potential solution is for the computing devices to be in the GMM Ready State at all times, thereby minimizing the state transitions. By keeping the computing devices always in the GMM Ready State, paging resources can be saved. Paging is limited to a cell, and this potential solution can save paging resources in all cells of a routing area (RA). The saving of paging resources can be attractive for low or no mobility devices. However, keeping the computing devices always in the GMM Ready State will result in high battery consumption.

With previous solutions, the frequent performance of random access by the computing devices (e.g., CIoT devices) results in increased signaling overhead, even when the computing devices are kept in the Packet Idle State of the GMM Ready State (also referred to as discontinuous reception (DRX) Mode) The frequent random access can also increase computing device power consumption.

In previous solutions, in the GMM Ready State, the computing device can move from the Packet Transfer State to the Packet Idle State after a transport block flow (TBF) is completed. After the TBF completion, the computing device can monitor all downlink packet common control channels (PCCCHs) for a defined duration, as configured by a non-DRX Timer. This period can be referred to as a Non-DRX Mode of the Packet Idle State (of the GMM Ready State). After the non-DRX Timer expires, the computing device can move from the Non-DRX Mode to DRX Mode of the Packet Idle State (of the GMM Ready State). During the DRX Mode, the computing device can monitor only its own paging group, and the computing device is reachable with an increased latency depending on the paging/DRX cycle.

In previous solutions, if a downlink (DL) packet arrives in the DRX Mode of the Packet Idle State (of the GMM Ready State), the network can page the computing device to move the computing device from the Packet Idle State to the Packet Transfer State. The computing device may not perform a contention-based random access procedure to move from the Packet Idle State to the Packet Transfer, as the computing device is already known at the cell level. A base station system (BSS) can send a DL immediate assignment to the computing device on the computing device's group specific paging channel. If a timing advance is not valid, the BSS can trigger the computing device to transmit a PACKET CONTROL ACKNOWLEDGEMENT message as four access bursts in a reserved uplink radio block specified by a reserved radio block period (RRBP) field. The PACKET CONTROL ACKNOWLEDGEMENT message (i.e., the four radio bursts) can be used to derive the timing advance in UL.

In previous solutions, if an uplink (UL) packet arrives in the DRX Mode of the Packet Idle State (of the GMM Ready State), the computing device can perform packet access (e.g., a random network access or channel request) to move from the Packet Idle State to the Packet Transfer State. However, frequent UL packet arrivals can cause an increased amount of random access signaling.

In some cases, for UL traffic, the computing device can expect a DL acknowledgement (ACK) from the network. For example, in Mobile Autonomous Reporting (MAR) type UL traffic transmissions, an ACK is expected for approximately 50% of the UL traffic transmissions. Similarly, for DL traffic (e.g., network command type of traffic), an uplink response/ACK may be utilized for approximately 50% of the DL transmissions. One potential solution is that after the data transmission/reception, the computing device can wait in a non-DRX Ready State until the computing device has received an ACK or transmitted a response. However, such a solution can adversely impact device power saving. In another potential solution, the computing device can receive the ACK or transmit the response during a DRX ON duration. However, DRX cycles can be very long as the objective of DRX is to maximize device power saving. Therefore, it may not be reasonable to delay the ACK/response by such a large delay.

The present technology aims to reduce the frequency of state transitions (e.g., GMM Ready State to GMM Standby State) in an EC-GSM system for computing devices (e.g., industrial CIoT devices) while minimizing device power consumption. More specifically, the present technology introduces a device power optimized Ready State for EC-GSM, which is referred to as Ready-State Discontinuous Reception (RS-DRX). The computing device (e.g., industrial CIoT device) will remain in the device power optimized GMM Ready State to save device power and to reduce network signaling overhead. In other words, the computing device does not switch to a Standby State. RS-DRX also enables the network to reach these computing devices with reduced latency. In RS-DRX, the computing device can sleep in between data receptions/transmissions in the GMM Ready State in order to save device power. During sleep, the computing device can skip monitoring the packet common control channels PCCCHs. The computing device can skip monitoring a GSM common control channel (CCCH) if the PCCCH is not configured. In RS-DRX, the computing device can periodically wake up for a short duration to check for possible downlink (DL) assignment messages. During the short awake period, the computing device can monitor all DL PCCCHs. When an incoming (DL) packet arrives for the computing device, the network can send a downlink assignment message on any of the PCCCHs in that cell during the awake period of the computing device.

In previous solutions, in case of UL packet arrival during the Packet Idle State (of the GMM Ready State), the computing device can perform packet access. The packet access can be performed on a random access channel, which is a contention-based network access procedure. If the network access is successful, the computing device obtains an UL immediate assignment to make a packet resource request. However, in RS-DRX, the computing device may transmit UL data only during the DRX ON duration to save power. As a result, in RS-DRX, device power can be saved and network signaling can be reduced, e.g., (i) by aggregating the UL packets during the sleep period, (ii) by aggregating the DL and UL packets during the sleep period, and (iii) waking up for DL and UL packet transmissions at the same time.

In RS-DRX, if an ACK/Response is desired after UL/DL traffic, the computing device can start a few shorter RS-DRX cycles immediately after the data transmission/reception without waiting for the reception/transmission of ACK/Response. The ACK/Response can be received or transmitted during the ON duration of these short RS-DRX cycles. This solution ensures the reception or transmission of the ACK/Response with reduced latency, while minimizing the device power consumption for ACK/Response reception/transmission. After the few short RS-DRX cycles occur, longer RS-DRX cycles can be started.

In the present technology, significant device power savings can be achieved by using a Ready State Discontinuous Reception (RS-DRX) in EC-GSM (i.e., GERAN based CIoT). With this solution, a computing device (e.g., a CIoT device) can sleep in between data receptions/transmissions in the GMM Ready State in order to save device power. While the computing device is asleep, the computing device will skip monitoring packet common control channels (PCCHs), such as the packet broadcast control channel (PBCCH), packet access grant channel (PAGCH), packet paging channel (PPCH), packet notification channel (PNCH), or a GSM common control channel (CCCH) if the PCCCH is not configured. The computing device can periodically wake up for a short duration to check for possible downlink (DL) transmissions. During the short awake period, the computing device can monitor all DL PCCCHs. When an incoming (DL) packet arrives for the computing device, the network can send a downlink assignment message on any one of the PCCCHs in that cell during the short awake period of the computing device. In addition, the computing device can sleep between data transmission/reception and the associated reception/transmission of ACK/Response for the data.

FIG. 1 illustrates an example of a computing device that switches from a GMM Ready State to a GMM Standby State. As an example, the computing device can be a cellular Internet of Things (CIoT) device. The computing device can switch between the GMM Ready State and the GMM Standby State in accordance with previous solutions. A logical link control (LLC) packet data unit (PDU) can be received at a base station for the computing device. A transport block flow (TBF) can be established to transfer the LLC PDU over the air interface from the base station to the computing device. The LLC PDU can go to a radio link control (RLC) layer/media access control (MAC) layer of the computing device. The TBF can be established in order to allocate a radio resource for the transmission of the LLC PDU. At this point, the computing device is in a Packet Transfer State of the GMM Ready State. A READY timer is started before starting TBF.

In one example, the TBF can be established during the GMM Ready State. More specifically, when TBF occurs, the computing device is in a Packet Transfer State of the GMM Ready State. The establishment of the TBF can coexist with the Packet Transfer State. After TBF is released, the computing device can switch from the Packet Transfer State to a Packet Idle State of the GMM Ready State. More specifically, the computing device can switch to a non-DRX Mode of the Packet Idle State (of the GMM Ready State). After the computing devices switches to the non-DRX mode, a non-DRX timer can start. While the non-DRX timer is running (during the non-DRX Mode of the Packet Idle State of the GMM Ready State), the computing device can remain fully awake and monitor all DL packet common control channels (PCCCHs) for paging and DL assignments. After expiry of the non-DRX timer, the computing device can transition from the non-DRX mode to a DRX mode. The DRX mode is within the Packet Idle State of the GMM Ready State. During the DRX mode (of the Packet Idle State of the GMM Ready State), the computing device can wake up only to read a PCCCH which corresponds to its paging group.

In one example, during the DRX mode (of the Packet Idle State of the GMM Ready State), the READY timer can expire, and at this point, the computing device can switch from the GMM Ready State to a GMM Standby State. More specifically, the computing device can transition into a Packet Idle State of the GMM Standby State. During the Packet Idle State of the GMM Standby State, the computing device can wake up only to read a PCCCH which corresponds to its paging group. The computing device can remain in the Packet Idle State of the GMM Standby State until another LLC PDU is received, at which point the computing device can switch back to the Packet Transfer State of the GMM Ready State. In other words, the computing device may continually switch between the GMM Ready State and the GMM Standby State in order to perform data transmissions or receptions.

Figure 2:
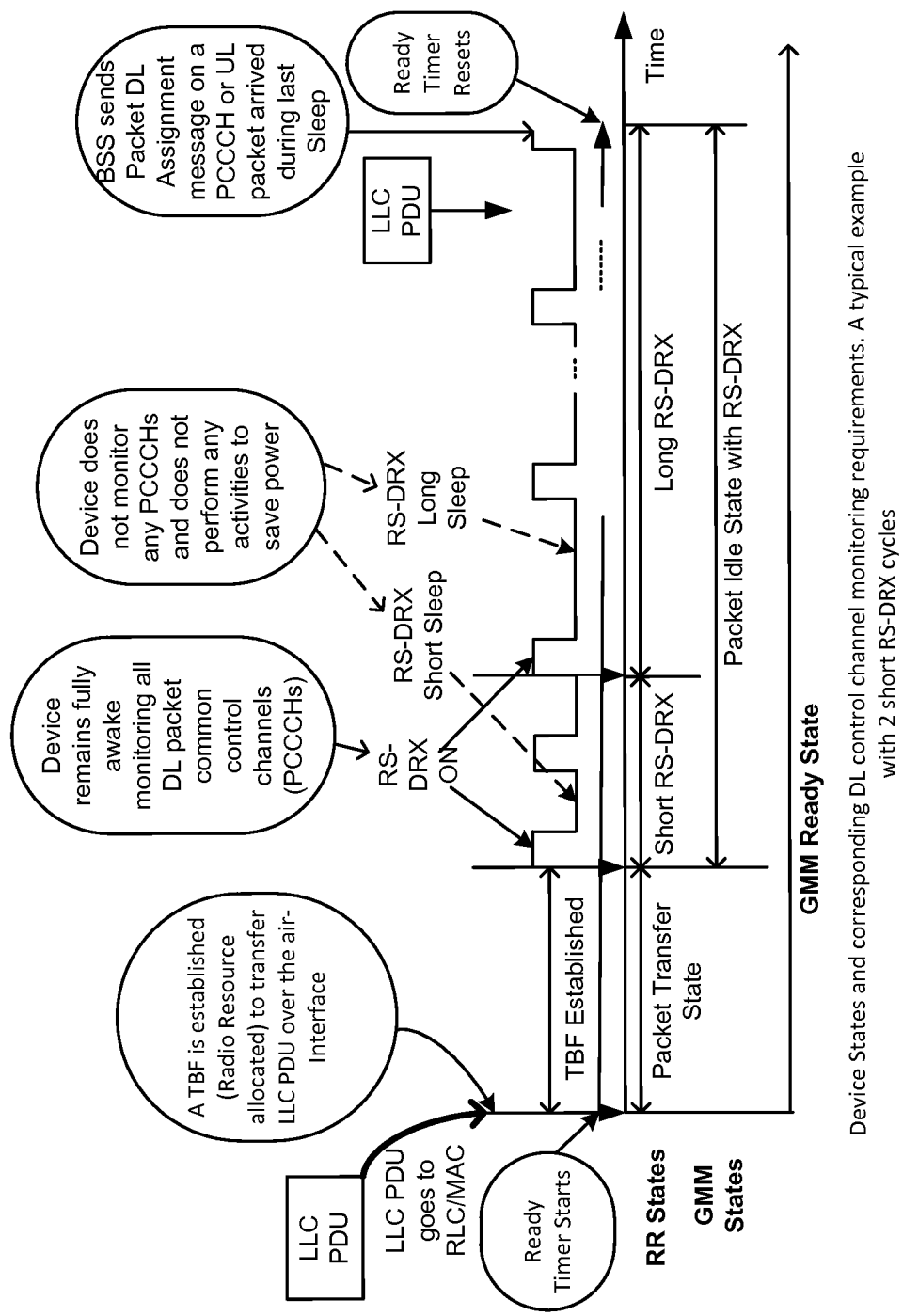
FIG. 2 illustrates a computing device that remains in a ready state without switching to a standby state in accordance with an example.

FIG. 2 illustrates an example of a computing device that remains in a GMM Ready State without switching to a GMM Standby State. A logical link control (LLC) packet data unit (PDU) can be received at a base station for the computing device. A transport block flow (TBF) can be established to transfer the LLC PDU over the air interface from the base station to the computing device. The LLC PDU can go to a radio link control (RLC) layer/media access control (MAC) layer of the computing device. The TBF can be established in order to allocate a radio resource for the transmission of the LLC PDU. At this point, the computing device can be in a Packet Transfer State of the GMM Ready State. A READY timer can be started while the TBF is established.

In one example, the TBF can be established during the GMM Ready State. More specifically, the TBF can be established during a Packet Transfer State of the GMM Ready State. After the TBF is established during the Packet Transfer State of the GMM Ready State (and the LLC PDU is transferred over the air interface), the computing device can switch from the Packet Transfer State to a Packet Idle State with RS-DRX (in the GMM Ready State). In other words, the computing device still remains in the GMM Ready State, and does not switch to a GMM Standby State. After the computing device switches from the Packet Transfer State to the Packet Idle State with RS-DRX, the computing device can start several Short RS-DRX cycles (e.g., two short RS-DRX cycles). At the beginning of each short RS-DRX cycle, the computing device can be ON for a defined duration. This can be referred to as RS-DRX ON. During the ON duration, the computing device can remain fully awake and monitor all DL packet common control channels (PCCCHs). When the computing device is not ON during the short RS-DRX cycles, the computing device can be asleep. This can be referred to as RS-DRX Short Sleep. During this time, the computing device does not monitor any PCCCHs and performs minimal activity in order to save power.

As described in further detail below, the few short RS-DRX cycles may enable the computing device to receive an ACK or transmit a response during the ON durations of the short RS-DRX cycles. The ACK/response can be in response to the LLC PDU that was transferred over the air interface.

After a few short RS-DRX cycles (which occur during the Packet Idle State with RS-DRX in the GMM Ready State), the computing device can start Long RS-DRX cycles. At this time, the computing device remains in the Packet Idle State with RS-DRX in the GMM Ready State. Similar to the short RS-DRX cycles, at the beginning of each long RS-DRX cycle, the computing device can be ON for a defined duration. This can be referred to as RS-DRX ON. During the ON duration, the computing device can remain fully awake and monitor all DL packet common control channels (PC-CCHs). When the computing device is not ON during the long RS-DRX cycles, the computing device can be asleep. This can be referred to as RS-DRX Long Sleep. During this time, the computing device does not monitor any PCCCHs and performs minimal activity in order to save power.

At some point during the long RS-DRX cycles, an LLC PDU can be received for the computing device. At the next ON duration in the long RS-DRX cycle, a base station system (BSS) can send a packet DL assignment message to the computing device on the PCCCH. The computing device can transition from the Packet Idle State with RS-DRX (in the GMM Ready State) back to the Packet Transfer State (in the GMM Ready State) in order to receive the DL packet. The computing device can reset the READY timer. As described above, the computing device can establish TBF for the LLC PDU to be transferred over the air interface, and then after a period of time, the computing device can revert back to the Packet Idle State with RS-DRX (in the GMM Ready State). Therefore, the computing device can continue running the long RS-DRX cycles until an LLC PDU is received at the base station, and then the computing device can switch to the Packet Transfer State in order to receive the LLC PDU from the base station.

In another example, during an ON duration of the long RS-DRX cycle, an UL packet can arrive for transmission. The computing device can transition from the Packet Idle State with RS-DRX (in the GMM Ready State) back to the Packet Transfer State (in the GMM Ready State) in order to transmit the UL packet. The computing device can reset the READY timer. As described above, the computing device can establish TBF for the LLC PDU to be transferred over the air interface, and then after a period of time, the computing device can revert back to the Packet Idle State with RS-DRX (in the GMM Ready State).

As shown in FIG. 2, the computing device can continually remain in the GMM Ready State without transitioning to the GMM Standby State, thereby resulting in reduction in network signaling (such as elimination of state transition signaling and reduction in paging signaling as paging is limited to only one cell). During the GMM Ready State, the computing device can implement a Packet Idle State with RS-DRX, during which the computing device runs several short RS-DRX cycles and then long RS-DRX cycles in order to enhance device power saving. The long RS-DRX cycles can be run until a new LLC PDU is received, and the computing device transitions back to the Packet Transfer State of the GMM Ready State.

In one configuration, in Ready-State Discontinuous Reception (RS-DRX), the computing device (e.g., CIoT device) always remains in the GMM Ready State by deactivating a READY Timer function. As further described in 3GPP Technical Specification (TS) 23.060, if a timer length is set to all "1"s (binary), the READY timer function is deactivated, i.e., the timer no longer runs and the computing device remains in the GMM READY State. In one example, the computing device can request the network for deactivation of the READY timer during an attach request procedure, which allows the computing device to always remain in the GMM Ready State. In an alternative configuration, the computing device can request the network for a RS-DRX configuration in the attach request procedure, and in response, the network can deactivate the READY timer for the computing device. By eliminating the state transitions between the GMM Ready State and the GMM Standby State, a significant amount of network signaling can be saved due to a reduced number of random access procedures (i.e., a reduced number of random access procedures are triggered). In addition, the elimination of the state transitions can avoid routing area (RA) level flooding of paging messages.

In one example, the computing device can request the network (e.g., BSS) for the RS-DRX configuration using a newly defined field in the attach request procedure. In one example, the computing device's request for RS-DRX can be forwarded from the BSS to the core network (e.g., SGSN), such that the core network can set the READY timer as deactivated for the computing device. As a result, the computing device can remain in the GMM Ready State with the RS-DRX mechanism running in the GMM Ready State. In addition, the core network can set the legacy non-DRX timer as zero for the computing device, and sends the legacy non-DRX timer to the computing device.

In one example, after receiving the request, the BSS can send the computing device various RS-DRX parameters in an attach response message. The RS-DRX parameters can include an RS-DRX ON duration, a Short RS-DRX Cycle, a number of Short RS-DRX cycles, Long RS-DRX Cycle, etc. Based on the RS-DRX parameters received from the BSS, the computing device can implement RS-DRX. In one example, after being configured for RS-DRX, the computing device can stay in the GMM Ready State with the RS-DRX mechanism running in the GMM Ready State in order to save device power.

In one example, the computing device may not receive an ACK for a transmission of an UL packet, or the computing device may not transmit a response for a reception of a DL packet. In this case, the BSS may not configure the short RS-DRX cycle (i.e., the number of short RS-DRX cycles will be set to 0). Otherwise, the BSS will configure the short RS-DRX cycle (i.e., the number of short RS-DRX cycles will be a non-zero value).

In one example, the BSS can select a value of the long RS-DRX cycle as an integer multiple of the short RS-DRX cycle (when the short RS-DRX cycle is configured). As a non-limiting example, the duration of the long RS-DRX cycle can be 8 times the duration of the short RS-DRX cycle. However, unlike the number of short RS-DRX cycles, the BSS does not set a number of long RS-DRX cycles.

In one example, after the computing device transmits an UL packet or receives a DL packet, the computing device does not explicitly wait for receiving an ACK or sending a response/ACK. After transmission/reception of an UL/DL packet, the computing can start the short RS-DRX cycles. During the ON periods of the short RS-DRX cycles, the computing device is capable of receiving an ACK or sending a response/ACK, which can improve device power savings and maintain a reasonably low latency when receiving/sending the ACK/response. Once the configured number of short RS-DRX cycles is completed, the computing device can enter/start the long RS-DRX cycles.

In one example, if an ACK is received for an UL packet or a Response/ACK is transmitted for a DL packet during the short DRX ON Duration, the computing device does not terminate the short RS-DRX cycle and enter into the long RS-DRX cycles. Rather, the computing device continues/maintains the DRX timers that are configured by the network. On the other hand, a reception or transmission of a data packet during the short DRX ON Duration (or a long DRX ON duration) can result in the termination of the RS-DRX cycles. The differentiation in the computing device's behavior for data packets and ACK/response can result in the computing device spending additional time in the RS-DRX sleep mode (both in the short RS-DRX cycles and the long RS-DRX cycles) in order to increase device power savings.

In one example, although eliminating the state transitions between the GMM Ready State and the GMM Standby State reduces signaling overhead, the power consumption in RS-DRX Sleep (in the GMM Ready State) may be slightly higher than sleep in the GMM Standby State. Therefore, if the packet inter-arrival time is longer (e.g., in hours or days), the benefit of keeping the computing device always in the GMM Ready State with RS-DRX is diminished.

In one example, as shown in FIG. 2, the computing device can establish a transport block flow (TBF) during a Packet Transfer State of the GMM Ready State. The computing device can establish the TBF (i.e., receives resource allocation) in order to permit transfer of an LLC PDU over the air interface. The transfer of the LLC PDU can involve an UL transmission from the computing device or a DL reception at the computing device. After completion of the TBF, in contrast to previous solutions, the computing device does not start a non-DRX timer. In RS-DRX, the value of non-DRX Timer is zero. Rather, the computing device starts periodic RS-DRX cycles (in a Packet Idle State with RS-DRX of the GMM Ready State). The computing device can first start short RS-DRX cycles, which are then followed by long RS-DRX cycles. The long RS-DRX cycles can run until another LLC PDU arrives, at which point, the computing device can switch back to the Packet Transfer State (of the GMM Ready State) and establish a new TBF.

In one example, as shown in FIG. 2, the RS-DRX ON and RS-DRX Sleep states (e.g., during the long RS-DRX cycles) can alternate until the next packet arrival (i.e., until the arrival of another LLC PDU). The RS-DRX ON and the RS-DRX Sleep can constitute a RS-DRX Cycle. Upon arrival of the next packet, the RS-DRX cycle is terminated and TBF is established. On completion of TBF for the next packet, the RS-DRX cycles start again.

In one example, a short wait timer (e.g., smaller value of non-DRX Timer) may be defined, such that the short wait timer starts after the TBF is established for the UL transmission or the DL reception. After the short wait timer expires, the computing device can start the periodic RS-DRX cycles. In other words, after the expiry of the short wait timer, the computing device can start the short RS-DRX cycles, which are then followed by the long RS-DRX cycles.

As shown in FIG. 2, if short RS-DRX cycles are configured, the computing device can start the short RS-DRX cycles based on the number of configured short RS-DRX cycles (as indicated in the parameter sent from the BSS to the computing device). After the short RS-DRX cycles, the computing device can start the long RS-DRX cycles. Each RS-DRX cycle (i.e., either the short RS-DRX cycle or the long RS-DRX cycle) starts with a RS-DRX ON duration followed by a sleep duration. The sleep duration can be referred to as RS-DRX Short Sleep or RS-DRX Long Sleep. During the RS-DRX ON duration, the computing device can monitor all DL PCCCHs to check for possible DL assignment messages from the base station. The RS-DRX ON duration can be relatively small in duration as compared to the legacy non-DRX timer in order to minimize the computing device's awake period, thereby saving device power. In order words, since the computing device is fully awake during the RS-DRX ON duration in order to monitor all of the DL PCCCHs, the duration of these periods may be minimized in order to save device power.

In one example, as shown in FIG. 2, if no DL assignment message is received during the RS-DRX ON duration for DL packet arrival, or if there was no UL packet arrival during the last RS-DRX Sleep, the computing device goes to sleep for a duration equal to RS-DRX Sleep. For example, the computing device can go to sleep in both the short RS-DRX cycles and the long RS-DRX cycles. During this sleep period, the computing device does not monitor any PCCCHs. In addition, during this sleep period, the computing device can skip other power consuming activities (e.g., serving/neighbor cell measurements). On the other hand, if a DL packet arrives while the computing device is in RS-DRX Sleep, the network (e.g., BSS) stores/buffers the DL packet and sends a DL assignment message to the computing device in the next RS-DRX ON duration (which follows the current RS-DRX Sleep). The computing device can identify the DL assignment message and switch to the Packet Transfer State (in the GMM Ready State) in order to receive the DL packet. If an UL packet arrives while the computing device is in RS-DRX Sleep, the computing device waits to perform a random access process until the next RS-DRX ON duration (which follows the current RS-DRX Sleep). At the next RS-DRX ON duration, the computing device can switch to the Packet Transfer State (in the GMM Ready State) in order to transmit the UL packet.

Figure 3:
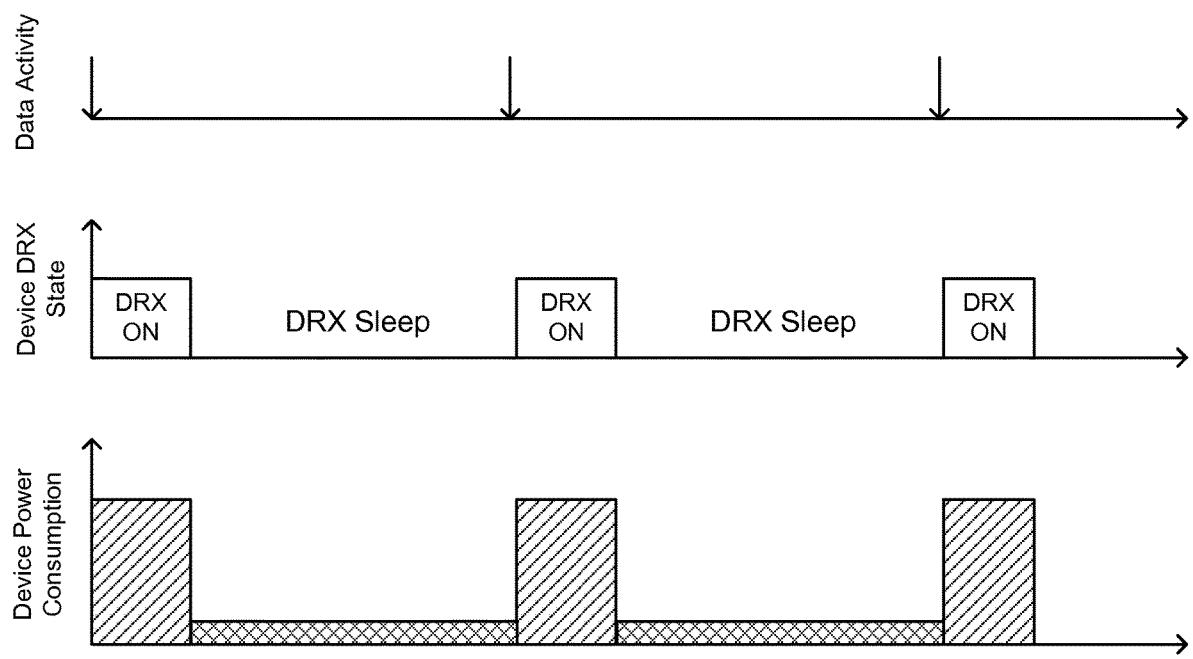
FIG. 3 illustrates an alignment between a ready state discontinuous reception (RS-DRX) and a packet arrival for a cellular Internet of Things (JOT) device in accordance with an example.

FIG. 3 illustrates an example of an alignment between a ready state discontinuous reception (RS-DRX) and a packet arrival for a computing device, such as a cellular Internet of Things (IoT) device. If the packet arrival for the computing device is periodic, then the RS-DRX cycles can be aligned such that the computing device is in a DRX ON state during or right after the packet arrival. This can be achieved by configuring the RS-DRX cycle in such a way that the packet arrival period is an integer multiple of the RS-DRX cycle. As shown in FIG. 3, when an UL packet arrives for transmission at the computing device, or a DL packet arrives for reception at the computing device, these events can correspond to the DRX ON durations. Since the packet arrivals are periodic, these DRX ON durations can be configured to correspond with the packet receptions/transmissions. The periods in which the packet receptions/transmissions do not occur can correspond to the DRX sleep times. Therefore, the computing device can sleep during periods in which no packet arrivals are expected.

In one example, a RS-DRX Start offset can be defined to provide the BSS with additional flexibility for controlling the distribution of RS-DRX ON periods of various computing devices. After a transport block flow (TBF) is established, the computing device can wait for the RS-DRX Start offset before entering the RS-DRX cycle. During the RS-DRX Start offset, the computing device can monitor all DL PCCCHs.

In one configuration, a computing device (e.g., a CIoT device) can run a signaling and power optimized mechanism, referred to as Ready State Discontinuous Reception (RS-DRX), in the GMM Ready State in EC-GSM. If the computing device decides to employ RS-DRX, the computing device can send a request to the network to be configured for RS-DRX. The computing device can send the request during an attach procedure. A base station (e.g., a BSS in EC-GSM) can receive the request, and in response, the base station can send a RS-DRX configuration to the computing device during the attach procedure. More specifically, the base station can determine the appropriate RS-DRX parameters/timers and sends these RS-DRX parameters/timers (as part of the RS-DRX configuration), such that the computing device and the base station run the same RS-DRX timers.

In one configuration, the BSS can forward the computing device's request to an entity in the core network, such as a serving GPRS support node (SGSN). The SGSN can set a READY timer as deactivated for the computing device, which results in the computing device remaining in the GMM Ready State with the RS-DRX mechanism running in the GMM Ready state.

In one configuration, the computing device can receive/read the RS-DRX configuration, and based on the RS-DRX configuration, the computing device can run the RS-DRX mechanism in the GMM Ready State. As a result, the computing device remains in the GMM Ready State and does not transition to a GMM Standby State.

In one configuration, the computing device can sleep in between data receptions/transmissions in the GMM Ready State in order to save device power. While the computing device is asleep, the computing device can skip monitoring the packet common control channels (PCCCHs), or the computing device can skip monitoring a GSM common control channel (CCCH) if the PCCCH is not configured. The computing device can periodically wake up for a short duration to check for any downlink packet arrivals. During this short awake period, the computing device can monitor all DL PCCCHs for possible DL assignment messages. For example, the base station can buffer a DL packet for the computing device while the computing device is asleep, and then the base station can send a DL assignment message to the computing device on a PCCCH in the next RS-DRX ON duration.

In one configuration, the computing device can determine whether short RS-DRX cycles are configured. In other words, the computing device can identify the cases in which an ACK/Response is desired for UL/DL traffic. The computing device can run two types of RS-DRX cycles—a short RS-DRX cycle and a long RS-DRX cycle—when an ACK/Response is desired for UL/DL traffic. The computing device can trigger a mechanism to start a few short RS-DRX cycles immediately after a data transmission/reception without waiting for a reception/transmission of an ACK/Response. An ACK/Response can be received or transmitted during an ON duration of these short RS-DRX cycles, which can ensure a reception or transmission of the ACK/Response is with reduced latency. In addition, this can minimize device power consumption for the ACK/Response reception or transmission. The computing device can identify when the short RS-DRX cycles end, and then the computing device can start long RS-DRX cycles.

In one configuration, the computing device can identify whether transmitted or received traffic is a data packet or an ACK/Response. If an ACK is received for an UL packet or a Response/ACK is transmitted for a DL packet during the DRX ON duration, the computing device does not terminate the RS-DRX cycle. Rather, the computing device will continue/maintain the DRX timers. On the other hand, if a reception or transmission of a data packet occurs during the DRX ON Duration, the computing device terminates the RS-DRX cycles. The computing device makes this differentiation between data packets and ACKs/Responses so that the computing device spends a maximum amount of time in a RS-DRX sleep mode, thereby increasing the amount of device power savings.

In one configuration, the base station (e.g., a BSS in EC-GSM) can direct a particular computing device to employ RS-DRX. In other words, rather than the computing device requesting a RS-DRX configuration from the base station, the base station can instruct the computing device to employ RS-DRX. The base station can transmit a RS-DRX configuration to the computing device in a radio resource control (RRC) message, for example, during an attach procedure.

In one configuration, the base station can transmit the RS-DRX configuration to a group of computing devices in system information messages.

In one configuration, the computing device (or group of computing devices) can receive/read the RS-DRX configuration, and based on the RS-DRX configuration, the computing device can run the RS-DRX mechanism in the GMM Ready State. As a result, the computing device remains in the GMM Ready State and does not transition to a GMM Standby State.

In one configuration, the base station can notify an entity in the core network, such as a serving GPRS support node (SGSN), that the base station has configured the computing device for RS-DRX. Therefore, the SGSN can set a READY timer as deactivated for the computing device, which results in the computing device remaining in the GMM Ready State with the RS-DRX mechanism running in the GMM Ready state.

In one configuration, the base station can determine whether the computing device desires an ACK/Response for UL/DL traffic. If an ACK/Response is desired for UL/DL traffic, the network can configure two types of RS-DRX Cycles—a short RS-DRX cycle and a long RS-DRX cycle—and sends these two types of RS-DRX Cycles to the computing device.

In one configuration, the base station can send an ACK to the computing device, or the base station can receive a response during the ON duration of the short RS-DRX cycles.

In one configuration, the base station can identify whether transmitted/received traffic to/from the computing device is a data packet or an ACK/Response. If an ACK sent to the computing device for an UL packet or a Response/ACK is received for a DL packet during the DRX ON duration, the base station can continue/maintain the ongoing DRX timers for the computing device. In other words, the base station does not assume that the DRX cycles for the computing device have been terminated. On the other hand, if a reception or transmission of a data packet from/to the computing device occurs during the DRX ON Duration, the base station can mark that the RS-DRX cycles are terminated for the computing device. Therefore, the base station can permit two separate behaviors at the computing device depending on whether the reception or transmission relates to a data packet or an ACK/Response.

Figure 4:
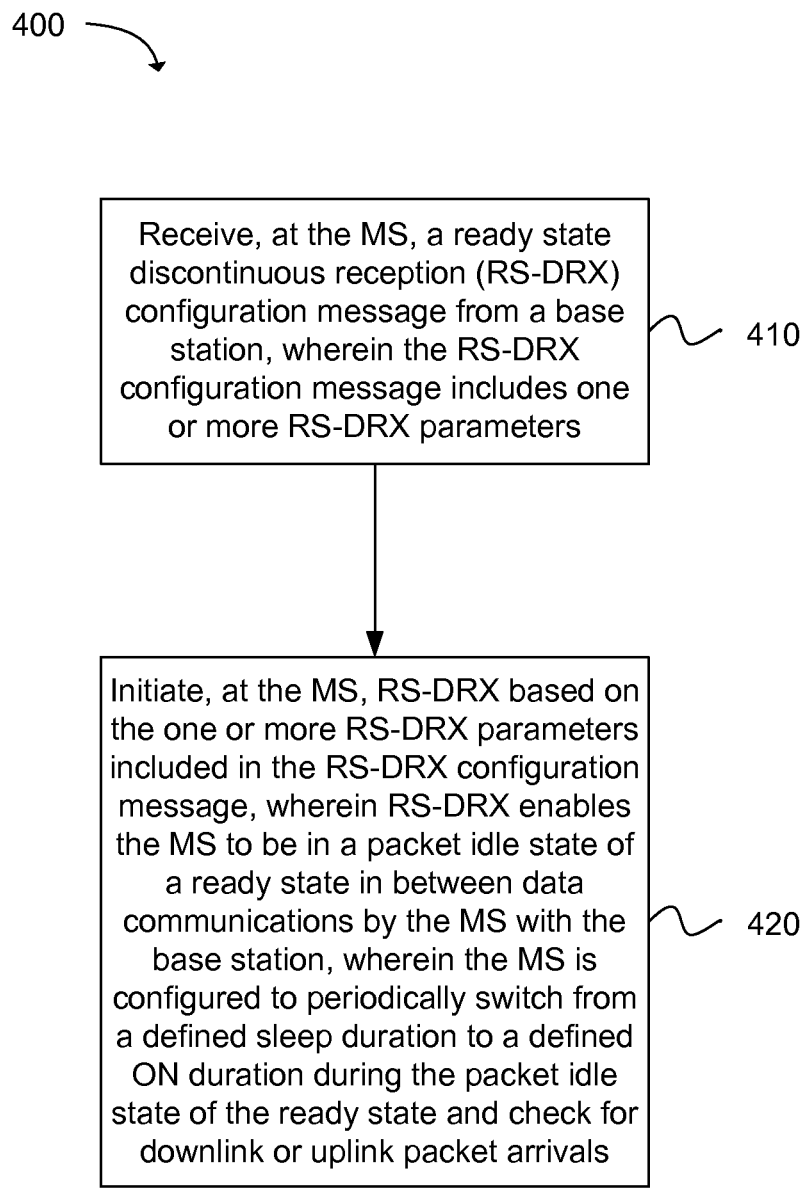
FIG. 4 depicts functionality of a mobile station (MS) configured for cellular Internet of Things (CIoT) in accordance with an example.

Another example provides functionality 400 of a mobile station (MS) configured for cellular Internet of Things (CIoT), as shown in the flow chart in FIG. 4. The functionality can be implemented as a method or the functionality can be executed as instructions on a machine, where the instructions are included on at least one computer readable medium or one non-transitory machine readable storage medium. The UE can comprise one or more processors and memory configured to: receive, at the MS, a ready state discontinuous reception (RS-DRX) configuration message from a base station, wherein the RS-DRX configuration message includes one or more RS-DRX parameters, as in block 410. The UE can comprise one or more processors and memory configured to: initiate, at the MS, RS-DRX based on the one or more RS-DRX parameters included in the RS-DRX configuration message, wherein RS-DRX enables the MS to be in a packet idle state of a ready state in between data communications by the MS with the base station, wherein the MS is configured to periodically switch from a defined sleep duration to a defined ON duration during the packet idle state of the ready state and check for downlink or uplink packet arrivals, as in block 420.

Figure 5:
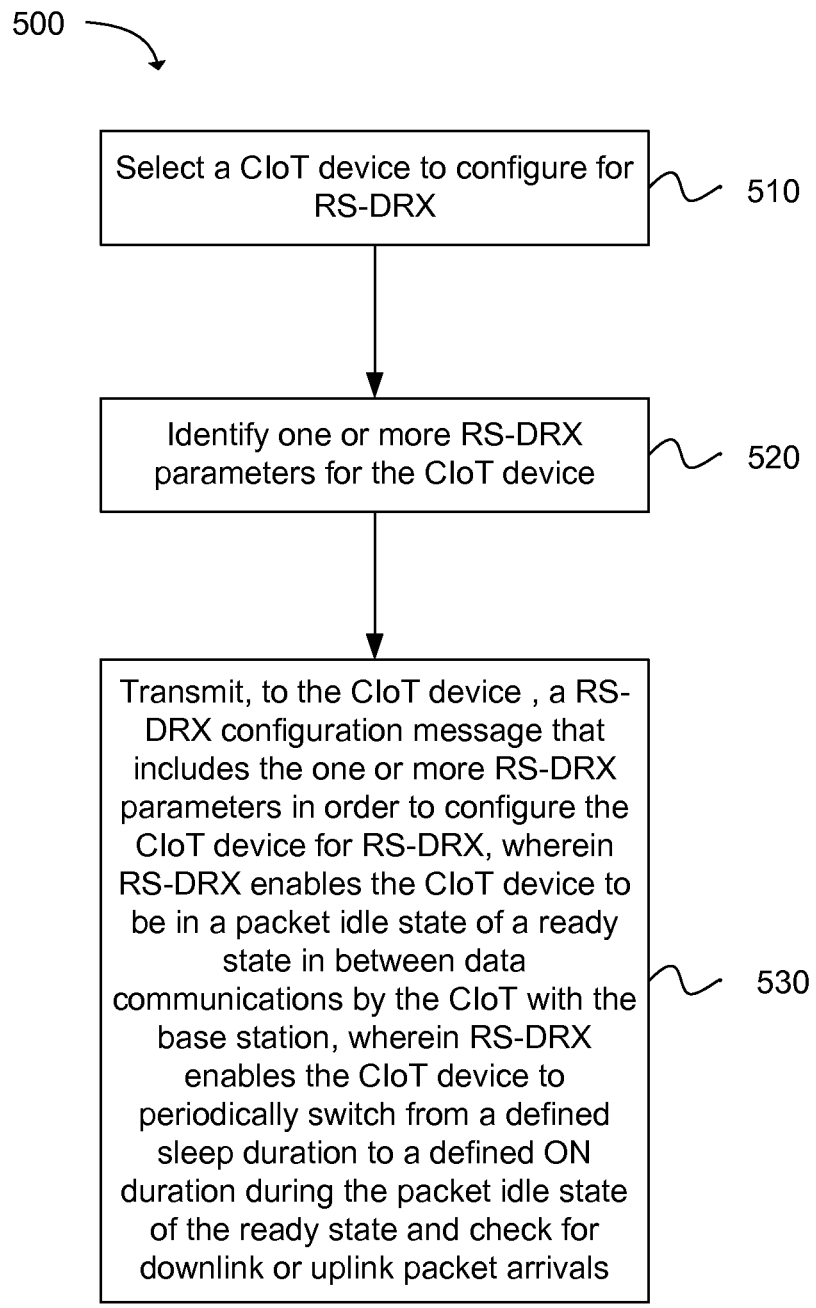
FIG. 5 depicts functionality of a base station operable to configure a cellular Internet of Things (CIoT) device for ready state discontinuous reception (RS-DRX) in accordance with an example.

Another example provides functionality 500 of a base station operable to configure a cellular Internet of Things (CIoT) device for ready state discontinuous reception (RS-DRX), as shown in the flow chart in FIG. 5. The functionality can be implemented as a method or the functionality can be executed as instructions on a machine, where the instructions are included on at least one computer readable medium or one non-transitory machine readable storage medium. The base station can comprise one or more processors and memory configured to: select a CIoT device to configure for RS-DRX, as in block 510. The base station can comprise one or more processors and memory configured to: identify one or more RS-DRX parameters for the CIoT device, as in block 520. The base station can comprise one or more processors and memory configured to: transmit, to the CIoT device, a RS-DRX configuration message that includes the one or more RS-DRX parameters in order to configure the CIoT device for RS-DRX, wherein RS-DRX enables the CIoT device to be in a packet idle state of a ready state in between data communications by the CIoT with the base station, wherein RS-DRX enables the CIoT device to periodically switch from a defined sleep duration to a defined ON duration during the packet idle state of the ready state and check for downlink or uplink packet arrivals, as in block 530.

Figure 6:
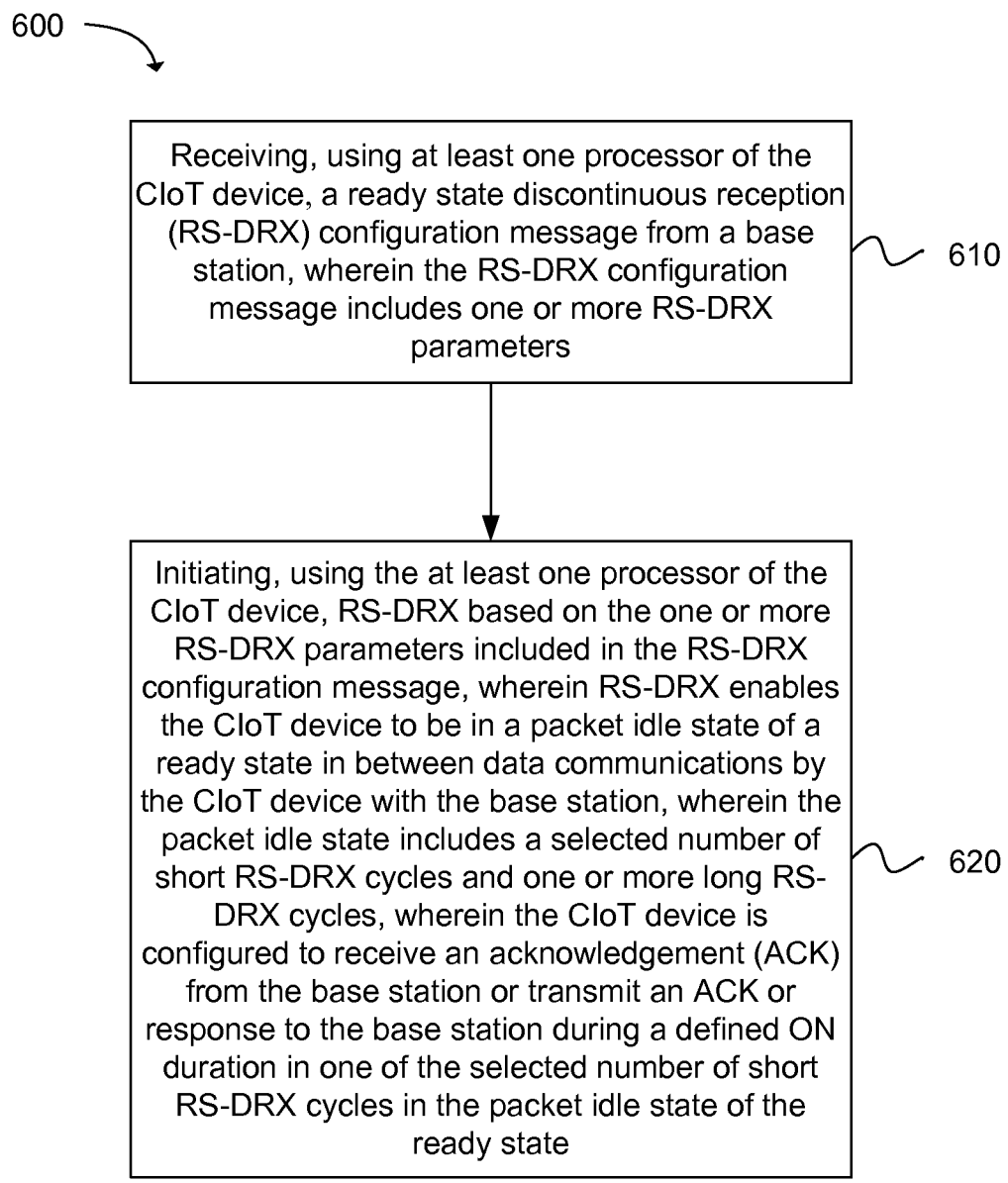
FIG. 6 depicts a flowchart of a machine readable storage medium having instructions embodied thereon for performing ready state discontinuous reception (RS-DRX) at a cellular Internet of Things (CIoT) device in accordance with an example.

Another example provides at least one machine readable storage medium having instructions 600 embodied thereon for performing ready state discontinuous reception (RS-DRX) at a cellular Internet of Things (CIoT) device, as shown in the flow chart in FIG. 6. The instructions can be executed on a machine, where the instructions are included on at least one computer readable medium or one non-transitory machine readable storage medium. The instructions when executed perform the following: receiving, using at least one processor of the CIoT device, a ready state discontinuous reception (RS-DRX) configuration message from a base station, wherein the RS-DRX configuration message includes one or more RS-DRX parameters, as in block 610. The instructions when executed perform the following: initiating, using the at least one processor of the CIoT device, RS-DRX based on the one or more RS-DRX parameters included in the RS-DRX configuration message, wherein RS-DRX enables the CIoT device to be in a packet idle state of a ready state in between data communications by the CIoT device with the base station, wherein the packet idle state includes a selected number of short RS-DRX cycles and one or more long RS-DRX cycles, wherein the CIoT device is configured to receive an acknowledgement (ACK) from the base station or transmit an ACK or response to the base station during a defined ON duration in one of the selected number of short RS-DRX cycles in the packet idle state of the ready state, as in block 620.

Figure 7:
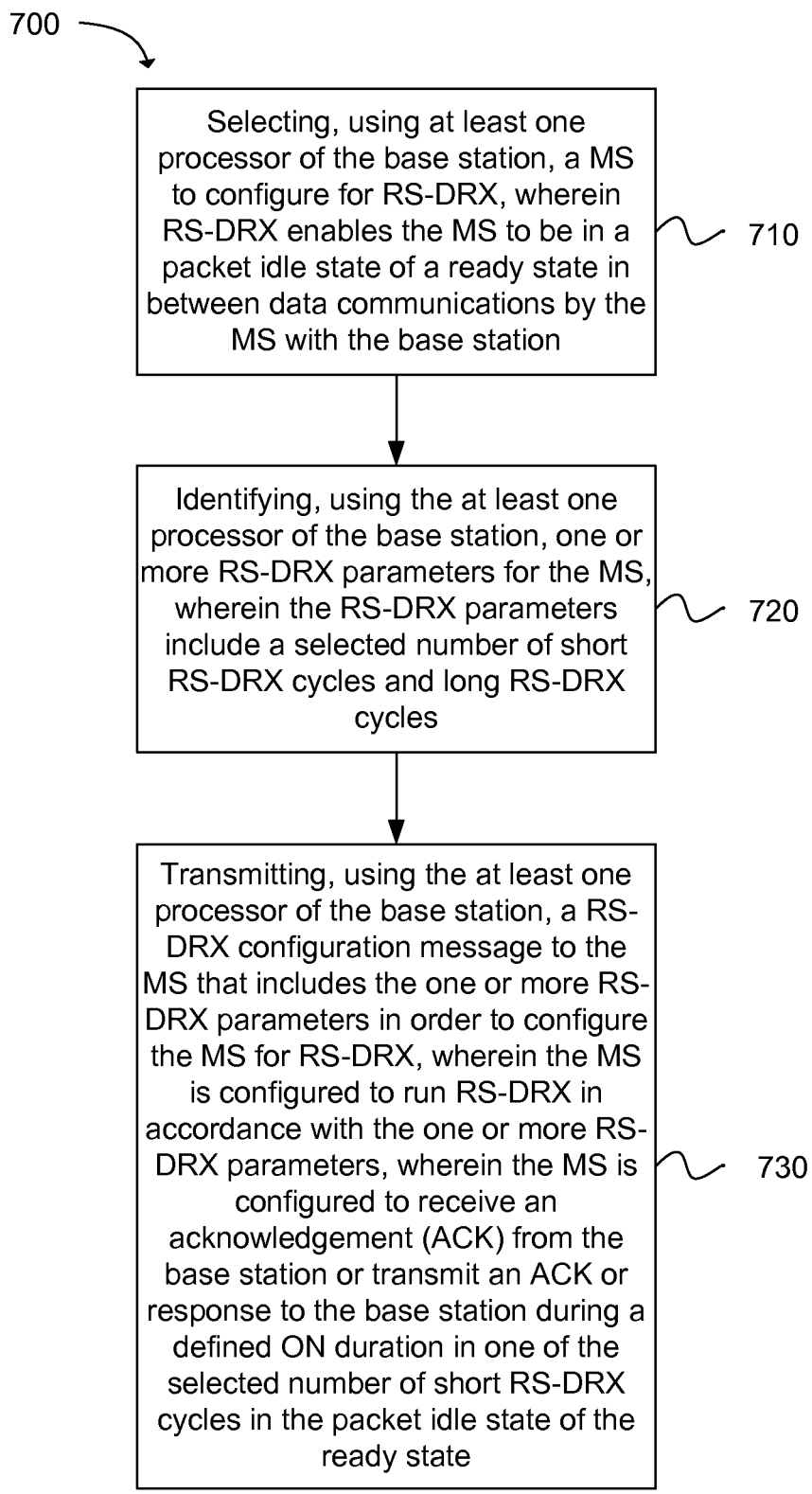
FIG. 7 depicts a flowchart of a machine readable storage medium having instructions embodied thereon for performing configuring mobile stations (MS) for ready state discontinuous reception (RS-DRX) at a base station in accordance with an example.

Another example provides at least one machine readable storage medium having instructions 700 embodied thereon for configuring mobile stations (MS) for ready state discontinuous reception (RS-DRX) at a base station, as shown in the flow chart in FIG. 7. The instructions can be executed on a machine, where the instructions are included on at least one computer readable medium or one non-transitory machine readable storage medium. The instructions when executed perform the following: selecting, using at least one processor of the base station, a MS to configure for RS-DRX, wherein RS-DRX enables the MS to be in a packet idle state of a ready state in between data communications by the MS with the base station, as in block 710. The instructions when executed perform the following: identifying, using the at least one processor of the base station, one or more RS-DRX parameters for the MS, wherein the RS-DRX parameters include a selected number of short RS-DRX cycles and long RS-DRX cycles, as in block 720. The instructions when executed perform the following: transmitting, using the at least one processor of the base station, a RS-DRX configuration message to the MS that includes the one or more RS-DRX parameters in order to configure the MS for RS-DRX, wherein the MS is configured to run RS-DRX in accordance with the one or more RS-DRX parameters, wherein the MS is configured to receive an acknowledgement (ACK) from the base station or transmit an ACK or response to the base station during a defined ON duration in one of the selected number of short RS-DRX cycles in the packet idle state of the ready state, as in block 730.

Figure 8:
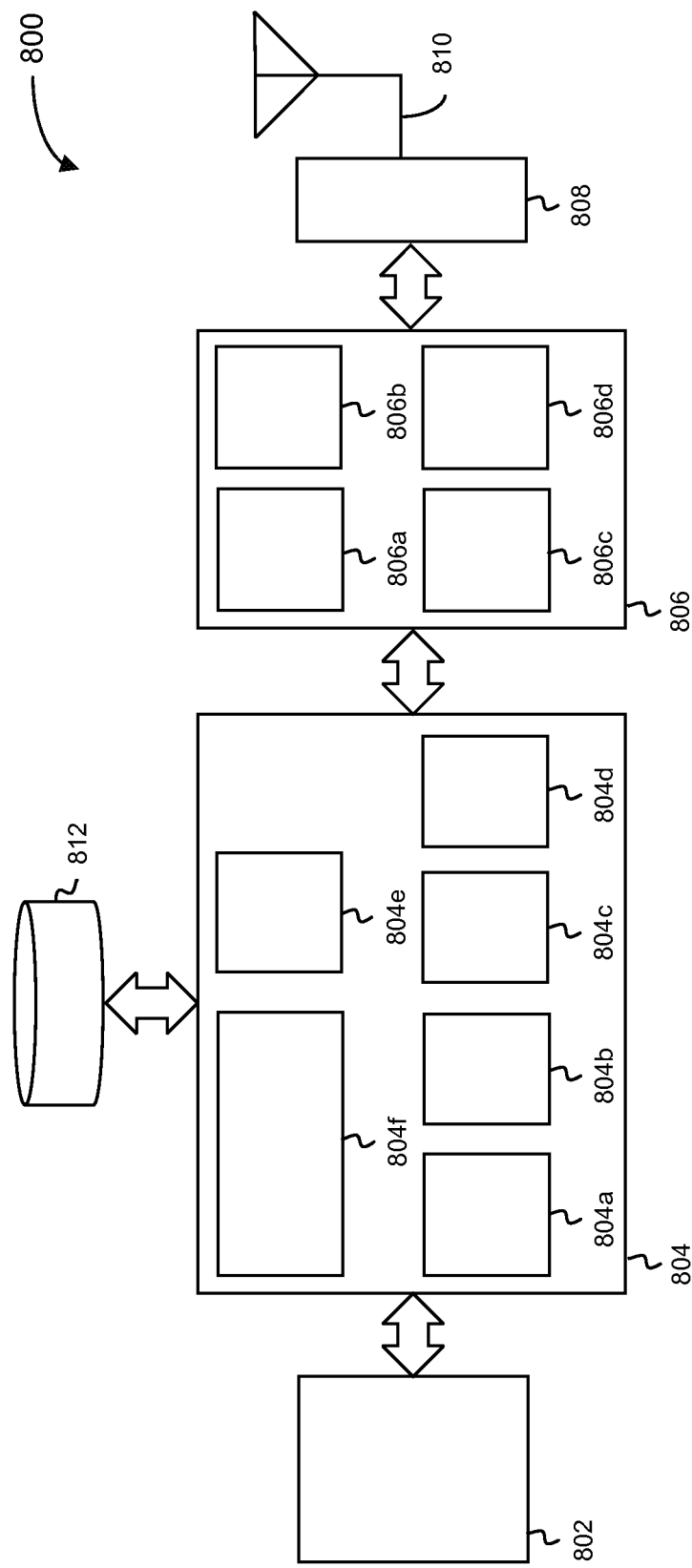
FIG. 8 illustrates a diagram of a wireless device (e.g., UE) in accordance with an example.

FIG. 8 provides an example illustration of a user equipment (UE) device 800, such as a wireless device, a mobile station (MS), a mobile wireless device, a mobile communication device, a tablet, a handset, or other type of wireless device. The UE device 800 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 800 can be configured to communicate using at least one wireless communication standard including 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 812 and may be configured to execute instructions stored in the storage medium 812 to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature down-conversion and/or up-conversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down-conversion and/or direct up-conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

Figure 9:
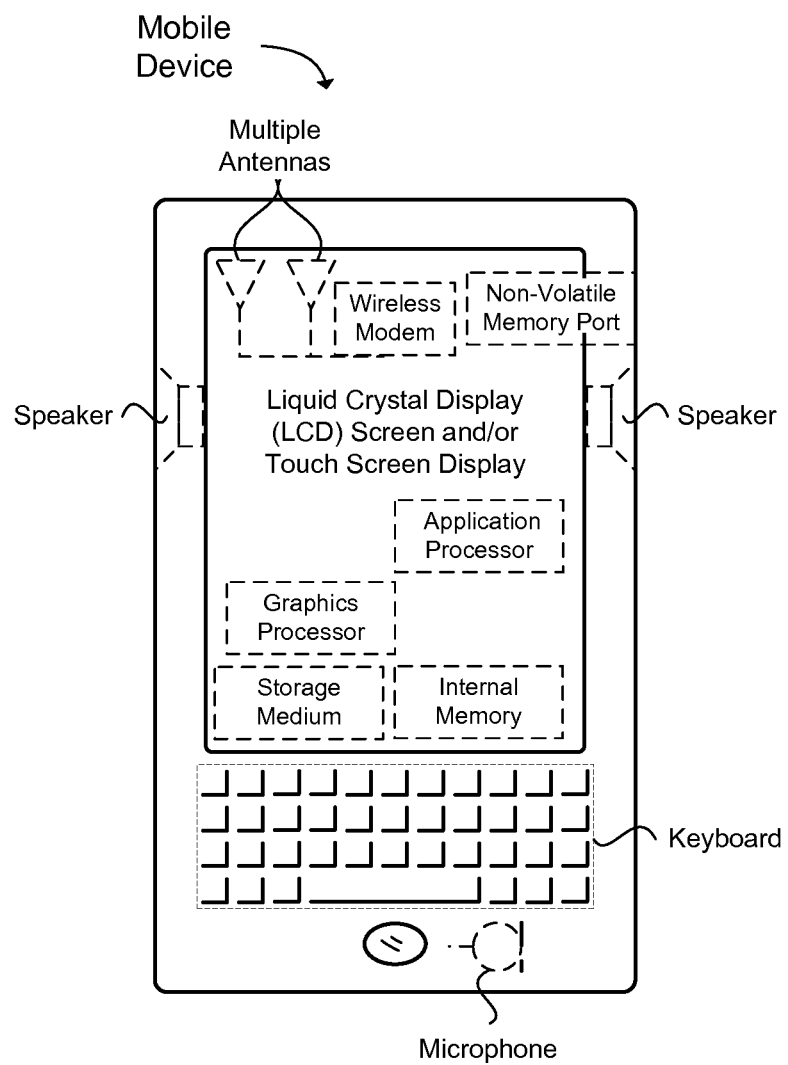
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or steps that can be used or otherwise combined in achieving such embodiments.

Example 1 includes an apparatus of a mobile station (MS) configured for cellular Internet of Things (CIoT), the apparatus comprising one or more processors and memory configured to: receive, at the MS, a ready state discontinuous reception (RS-DRX) configuration message from a base station, wherein the RS-DRX configuration message includes one or more RS-DRX parameters; and initiate, at the MS, RS-DRX based on the one or more RS-DRX parameters included in the RS-DRX configuration message, wherein RS-DRX enables the MS to be in a packet idle state of a ready state in between data communications by the MS with the base station, wherein the MS is configured to periodically switch from a defined sleep duration to a defined ON duration during the packet idle state of the ready state and check for downlink or uplink packet arrivals.

Example 2 includes the apparatus of Example 1, further configured to: monitor a downlink packet common control channel (PCCCH) during the defined ON duration.

Example 3 includes the apparatus of any of Examples 1-2, further configured to: receive a downlink assignment message on the PCCCH from the base station during the defined ON duration when an incoming downlink packet arrives at the base station for the MS; and transition from the packet idle state of the ready state to a packet transfer state of the ready state and receive the downlink packet from the base station.

Example 4 includes the apparatus of any of Examples 1-3, further configured to establish a transport block flow (TBF) during the packet transfer state of the ready state for an allocation of resources to receive the downlink packet from the base station over an air interface.

Example 5 includes the apparatus of any of Examples 1-4, further configured to: start, at the MS, a wait timer after reception of the downlink packet from the base station, wherein the wait timer includes a value of zero; and transition from the packet transfer state of the ready state back to the packet idle state of the ready state upon expiry of the wait timer.

Example 6 includes the apparatus of any of Examples 1-5, further configured to: identify, at the MS, an uplink packet during the defined ON duration that is ready for transmission; and transition from the packet idle state of the ready state to a packet transfer state of the ready state and transmit the uplink packet to the base station.

Example 7 includes the apparatus of any of Examples 1-6, wherein the packet idle state includes one or more RS-DRX cycles, wherein the RS-DRX cycles include one or more long RS-DRX cycles, wherein each long RS-DRX cycle includes a defined ON duration and a defined sleep duration.

Example 8 includes the apparatus of any of Examples 1-7, further configured to receive the RS-DRX configuration message from the base station in response to sending a request for a RS-DRX configuration to the base station.

Example 9 includes the apparatus of any of Examples 1-8, wherein the downlink and uplink packets are logical link control (LLC) packet data units (PDUs).

Example 10 includes the apparatus of any of Examples 1-9, wherein the MS continually remains in the ready state by deactivating a READY timer and the MS does not transition to a standby state.

Example 11 includes the apparatus of any of Examples 1-10, wherein the MS is configured to receive the RS-DRX configuration message that includes the one or more RS-DRX parameters from the base station during an attach procedure, wherein the one or more RS-DRX parameters includes at least one of: an RS-DRX ON duration parameter and a long RS-DRX cycle parameter.

Example 12 includes the apparatus of any of Examples 1-11, wherein the MS is configured to operate in a Global System for Mobile Communications (GSM) Enhanced Data rates for GSM Evolution (EDGE) Radio Access Network (GERAN).

Example 13 includes the apparatus of any of Examples 1-12, wherein the relay MS includes at least one of an antenna, a touch sensitive display screen, a speaker, a microphone, a graphics processor, an application processor, a baseband processor, an internal memory, a non-volatile memory port, and combinations thereof.

Example 14 includes an apparatus of a base station operable to configure a cellular Internet of Things (CIoT) device for ready state discontinuous reception (RS-DRX), the apparatus comprising one or more processors and memory configured to: select a CIoT device to configure for RS-DRX; identify one or more RS-DRX parameters for the CIoT device; and transmit, to the CIoT device, a RS-DRX configuration message that includes the one or more RS-DRX parameters in order to configure the CIoT device for RS-DRX, wherein RS-DRX enables the CIoT device to be in a packet idle state of a ready state in between data communications by the CIoT with the base station, wherein RS-DRX enables the CIoT device to periodically switch from a defined sleep duration to a defined ON duration during the packet idle state of the ready state and check for downlink or uplink packet arrivals.

Example 15 includes the apparatus of Example 14, further configured to: store a downlink packet for the CIoT device at a buffer of the base station; send, to the CIoT device, a downlink assignment message on a downlink packet common control channel (PCCCH) during the defined ON duration, wherein the CIoT device is configured to transition from the packet idle state of the ready state to a packet transfer state of the ready state after receiving a downlink assignment message in order to receive the downlink packet from the base station.

Example 16 includes the apparatus of any of Examples 14-15, further configured to: send a notification to a serving general packet radio service (GPRS) support node (SGSN) after configuring the CIoT device for RS-DRX.

Example 17 includes the apparatus of any of Examples 14-16, further configured to: transmit the RS-DRX configuration message to the CIoT device during an attach procedure.

Example 18 includes the apparatus of any of Examples 14-17, wherein the one or more RS-DRX parameters include at least one of: an RS-DRX ON duration parameter and a long RS-DRX cycle parameter.

Example 19 includes at least one machine readable storage medium having instructions embodied thereon for performing ready state discontinuous reception (RS-DRX) at a cellular Internet of Things (CIoT) device, the instructions when executed perform the following: receiving, using at least one processor of the CIoT device, a ready state discontinuous reception (RS-DRX) configuration message from a base station, wherein the RS-DRX configuration message includes one or more RS-DRX parameters; and initiating, using the at least one processor of the CIoT device, RS-DRX based on the one or more RS-DRX parameters included in the RS-DRX configuration message, wherein RS-DRX enables the CIoT device to be in a packet idle state of a ready state in between data communications by the CIoT device with the base station, wherein the packet idle state includes a selected number of short RS-DRX cycles and one or more long RS-DRX cycles, wherein the CIoT device is configured to receive an acknowledgement (ACK) from the base station or transmit an ACK or response to the base station during a defined ON duration in one of the selected number of short RS-DRX cycles in the packet idle state of the ready state.

Example 20 includes the at least one machine readable storage medium of Example 19, further comprising instructions which when executed by the at least one processor of the CIoT device performs the following: initiating the selected number of short RS-DRX cycles after a data communication with the base station, wherein the CIoT device is configured to perform the data communication with the base station in a packet transfer state of the ready state.

Example 21 includes the at least one machine readable storage medium of any of Examples 19-20, further comprising instructions which when executed by the at least one processor of the CIoT device performs the following: initiating the one or more long RS-DRX cycles after the selected number of short RS-DRX cycles.

Example 22 includes the at least one machine readable storage medium of any of Examples 19-21, wherein the CIoT device is configured with the packet idle state that includes the selected number of short RS-DRX cycles when the CIoT device is expected to receive the ACK or transmit the ACK or response after the data communication with the base station.

Example 23 includes the at least one machine readable storage medium of any of Examples 19-22, wherein reception of the ACK or transmission of the ACK or response during the defined ON duration in one of the selected number of short RS-DRX cycles does not terminate a remaining number of short RS-DRX cycles, wherein the CIoT device initiates the one or more long RS-DRX cycles after the selected number of short RS-DRX cycles.

Example 24 includes the at least one machine readable storage medium of any of Examples 19-23, wherein reception of a downlink assignment message from the base station during the defined ON duration in one of the selected number of short RS-DRX cycles terminates a remaining number of short RS-DRX cycles and the CIoT device transitions into a packet transfer state in order to receive a downlink packet from the base station.

Example 25 includes the at least one machine readable storage medium of any of Examples 19-24, wherein the CIoT device is configured to receive the RS-DRX configuration message that includes the one or more RS-DRX parameters from the base station during an attach procedure, wherein the one or more RS-DRX parameters include at least one of: an RS-DRX ON duration parameter, a short RS-DRX cycle parameter, a long RS-DRX cycle parameter, or the selected number of short RS-DRX cycles.

Example 26 includes the at least one machine readable storage medium of any of Examples 19-25, wherein each of the short RS-DRX cycles and long RS-DRX cycles include a defined ON duration and a defined sleep duration.

Example 27 includes the at least one machine readable storage medium of any of Examples 18-26, wherein a duration of the long RS-DRX cycles are integer multiples of a duration of the short RS-DRX cycles.

Example 28 includes at least one machine readable storage medium having instructions embodied thereon for configuring mobile stations (MS) for ready state discontinuous reception (RS-DRX) at a base station, the instructions when executed perform the following: selecting, using at least one processor of the base station, a MS to configure for RS-DRX, wherein RS-DRX enables the MS to be in a packet idle state of a ready state in between data communications by the MS with the base station; identifying, using the at least one processor of the base station, one or more RS-DRX parameters for the MS, wherein the RS-DRX parameters include a selected number of short RS-DRX cycles and long RS-DRX cycles; and transmitting, using the at least one processor of the base station, a RS-DRX configuration message to the MS that includes the one or more RS-DRX parameters in order to configure the MS for RS-DRX, wherein the MS is configured to run RS-DRX in accordance with the one or more RS-DRX parameters, wherein the MS is configured to receive an acknowledgement (ACK) from the base station or transmit an ACK or response to the base station during a defined ON duration in one of the selected number of short RS-DRX cycles in the packet idle state of the ready state.

Example 29 includes the at least one machine readable storage medium of Example 28, further comprising instructions which when executed by the at least one processor of the base station performs the following: storing a downlink packet for the MS at a buffer of the base station; and sending, to the MS, a downlink assignment message during the defined ON duration in one of the selected number of short RS-DRX cycles, wherein the MS is configured to terminate a remaining number of short RS-DRX cycles and transition into a packet transfer state in order to receive a downlink packet from the base station.

Example 30 includes the at least one machine readable storage medium of any of Examples 28-29, further comprising instructions which when executed by the at least one processor of the base station performs the following: sending a notification to a serving general packet radio service (GPRS) support node (SGSN) after configuring the MS for RS-DRX.

Example 31 includes the at least one machine readable storage medium of any of Examples 28-30, wherein the selected number of short RS-DRX cycles is included in the one or more RS-DRX parameters when the MS is expected to receive the ACK or transmit the ACK or response after a data communication with the base station.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a mobile station (MS) configured for cellular Internet of Things (CIoT), the apparatus comprising one or more processors and memory configured to:
receive, at the MS, a ready state discontinuous reception (RS-DRX) configuration message from a base station, wherein the RS-DRX configuration message includes one or more RS-DRX parameters;
initiate, at the MS, RS-DRX based on the one or more RS-DRX parameters included in the RS-DRX configuration message, wherein RS-DRX enables the MS to be in a packet idle state of a ready state in between CIoT data communications by the MS with the base station, wherein the MS is configured to periodically switch from a defined sleep duration to a defined ON duration during the packet idle state of the ready state and check for downlink or uplink packet arrivals; and
receive a downlink assignment message on a downlink packet common control channel (PCCCH) from the base station during the defined ON duration during the packet idle state of the ready state when an incoming downlink packet arrives at the base station for the MS.

2. The apparatus of claim 1, further configured to monitor a downlink packet common control channel (PCCCH) during the defined ON duration.

3. The apparatus of claim 1, further configured to:
transition from the packet idle state of the ready state to a packet transfer state of the ready state and receive the downlink packet from the base station.

4. The apparatus of claim 3, further configured to establish a transport block flow (TBF) during the packet transfer state of the ready state for an allocation of resources to receive the downlink packet from the base station over an air interface.

5. The apparatus of claim 3, further configured to:
start, at the MS, a wait timer after reception of the downlink packet from the base station, wherein the wait timer includes a value of zero; and
transition from the packet transfer state of the ready state back to the packet idle state of the ready state upon expiry of the wait timer.

6. The apparatus of claim 1, further configured to:
identify, at the MS, an uplink packet during the defined ON duration that is ready for transmission; and
transition from the packet idle state of the ready state to a packet transfer state of the ready state and transmit the uplink packet to the base station.

7. The apparatus of claim 1, wherein the packet idle state includes one or more RS-DRX cycles, wherein the RS-DRX cycles include one or more long RS-DRX cycles, wherein each long RS-DRX cycle includes a defined ON duration and a defined sleep duration.

8. The apparatus of claim 1, further configured to receive the RS-DRX configuration message from the base station in response to sending a request for a RS-DRX configuration to the base station.

9. The apparatus of claim 1, wherein the downlink or uplink packet arrivals are logical link control (LLC) packet data units (PDUs).

10. The apparatus of claim 1, wherein the MS continually remains in the ready state by deactivating a READY timer and the MS does not transition to a standby state.

11. The apparatus of claim 1, wherein the MS is configured to receive the RS-DRX configuration message that includes the one or more RS-DRX parameters from the base station during an attach procedure, wherein the one or more RS-DRX parameters includes at least one of: an RS-DRX ON duration parameter and a long RS-DRX cycle parameter.

12. The apparatus of claim 1, wherein the MS is configured to operate in a Global System for Mobile Communications (GSM) Enhanced Data rates for GSM Evolution (EDGE) Radio Access Network (GERAN).

13. The apparatus of claim 1, wherein the MS includes at least one of an antenna, a touch sensitive display screen, a speaker, a microphone, a graphics processor, an application processor, a baseband processor, an internal memory, a non-volatile memory port, and combinations thereof.

14. An apparatus of a base station operable to configure a cellular Internet of Things (CIoT) device for ready state discontinuous reception (RS-DRX), the apparatus comprising one or more processors and memory configured to:
select a CIoT device to configure for RS-DRX;
identify one or more RS-DRX parameters for the CIoT device, the one or more RS-DRX parameters including a selected number of short RS-DRX cycles and long RS-DRX cycles;
transmit, to the CIoT device, a RS-DRX configuration message that includes the one or more RS-DRX parameters in order to configure the CIoT device for RS-DRX, wherein RS-DRX enables the CIoT device to be in a packet idle state of a ready state in between data communications by the CIoT device with the base station, wherein RS-DRX enables the CIoT device to periodically switch from a defined sleep duration to a defined ON duration during the packet idle state of the ready state and check for downlink or uplink packet arrivals; and
send, to the CIoT device, a downlink assignment message on a downlink packet common control channel (PCCCH) during the defined ON duration during the packet idle state of the ready state.

15. The apparatus of claim 14, further configured to:
store a downlink packet for the CIoT device at a buffer of the base station,
wherein the CIoT device is configured to transition from the packet idle state of the ready state to a packet transfer state of the ready state after receiving the downlink assignment message in order to receive the downlink packet from the base station.

16. The apparatus of claim 14, further configured to: send a notification to a serving general packet radio service (GPRS) support node (SGSN) after configuring the CIoT device for RS-DRX.

17. The apparatus of claim 14, further configured to: transmit the RS-DRX configuration message to the CIoT device during an attach procedure.

18. The apparatus of claim 14, wherein the one or more RS-DRX parameters include at least one of: an RS-DRX ON duration parameter and a long RS-DRX cycle parameter.

19. At least one non-transitory machine readable storage medium having instructions embodied thereon for performing ready state discontinuous reception (RS-DRX) at a cellular Internet of Things (CIoT) device, the instructions when executed perform the following:
receiving, using at least one processor of the CIoT device, a ready state discontinuous reception (RS-DRX) configuration message from a base station, wherein the RS-DRX configuration message includes one or more RS-DRX parameters;
initiating, using the at least one processor of the CIoT device, RS-DRX based on the one or more RS-DRX parameters included in the RS-DRX configuration message, wherein RS-DRX enables the CIoT device to be in a packet idle state of a ready state in between data communications by the CIoT device with the base station, wherein the packet idle state includes a selected number of short RS-DRX cycles and one or more long RS-DRX cycles, wherein the CIoT device is configured to receive an acknowledgement (ACK) from the base station or transmit an ACK or response to the base station during a defined ON duration in one of the selected number of short RS-DRX cycles in the packet idle state of the ready state, and receive a downlink assignment message on a downlink packet common control channel (PCCCH) from the base station during the defined ON duration during the packet idle state of the ready state when an incoming downlink packet arrives at the base station for the CIoT device.

20. The at least one non-transitory machine readable storage medium of claim 19, further comprising instructions which when executed by the at least one processor of the CIoT device performs the following: initiating the selected number of short RS-DRX cycles after a data communication with the base station, wherein the CIoT device is configured to perform the data communication with the base station in a packet transfer state of the ready state.

21. The at least one non-transitory machine readable storage medium of claim 20, further comprising instructions which when executed by the at least one processor of the CIoT device performs the following: initiating the one or more long RS-DRX cycles after the selected number of short RS-DRX cycles.

22. The at least one non-transitory machine readable storage medium of claim 20, wherein the CIoT device is configured with the packet idle state that includes the selected number of short RS-DRX cycles when the CIoT device is expected to receive the ACK or transmit the ACK or response after the data communication with the base station.

23. The at least one non-transitory machine readable storage medium of claim 19, wherein reception of the ACK or transmission of the ACK or response during the defined ON duration in one of the selected number of short RS-DRX cycles does not terminate a remaining number of short RS-DRX cycles, wherein the CIoT device initiates the one or more long RS-DRX cycles after the selected number of short RS-DRX cycles.

24. The at least one non-transitory machine readable storage medium of claim 19, wherein reception of the downlink assignment message from the base station during the defined ON duration in one of the selected number of short RS-DRX cycles terminates a remaining number of short RS-DRX cycles and the CIoT device transitions into a packet transfer state in order to receive a downlink packet from the base station.

25. The at least one non-transitory machine readable storage medium of claim 19, wherein the CIoT device is configured to receive the RS-DRX configuration message that includes the one or more RS-DRX parameters from the base station during an attach procedure, wherein the one or more RS-DRX parameters include at least one of: an RS-DRX ON duration parameter, a short RS-DRX cycle parameter, a long RS-DRX cycle parameter, or the selected number of short RS-DRX cycles.

26. The at least one non-transitory machine readable storage medium of claim 19, wherein each of the short RS-DRX cycles and long RS-DRX cycles include a defined ON duration and a defined sleep duration.

27. The at least one non-transitory machine readable storage medium of claim 19, wherein a duration of the long RS-DRX cycles are integer multiples of a duration of the short RS-DRX cycles.

28. At least one non-transitory machine readable storage medium having instructions embodied thereon for configuring mobile stations (MS) for ready state discontinuous reception (RS-DRX) at a base station, the instructions when executed perform the following:

selecting, using at least one processor of the base station, a MS to configure for RS-DRX, wherein RS-DRX enables the MS to be in a packet idle state of a ready state in between cellular Internet of Things (CIoT) data communications by the MS with the base station;

identifying, using the at least one processor of the base station, one or more RS-DRX parameters for the MS, wherein the RS-DRX parameters include a selected number of short RS-DRX cycles and long RS-DRX cycles;

transmitting, using the at least one processor of the base station, a RS-DRX configuration message to the MS that includes the one or more RS-DRX parameters in order to configure the MS for RS-DRX, wherein the MS is configured to run RS-DRX with the one or more RS-DRX parameters, wherein the MS is configured to receive an acknowledgement (ACK) from the base station or transmit an ACK or response to the base station during a defined ON duration in one of the selected number of short RS-DRX cycles in the packet idle state of the ready state; and sending, to the MS, a downlink assignment message during the defined ON duration during the packet idle state of the ready state in one of the selected number of short RS-DRX cycles.

29. The at least one non-transitory machine readable storage medium of claim 28, further comprising instructions which when executed by the at least one processor of the base station performs the following:

storing a downlink packet for the MS at a buffer of the base station, wherein the MS is configured to terminate a remaining number of short RS-DRX cycles and transition into a packet transfer state in order to receive a downlink packet from the base station.

30. The at least one non-transitory machine readable storage medium of claim 28, further comprising instructions which when executed by the at least one processor of the base station performs the following: sending a notification to a serving general packet radio service (GPRS) support node (SGSN) after configuring the MS for RS-DRX.

31. The at least one non-transitory machine readable storage medium of claim 28, wherein the selected number of short RS-DRX cycles is included in the one or more RS-DRX parameters when the MS is expected to receive the ACK or transmit the ACK or response after a data communication with the base station.

* * * * *